(12) United States Patent
Shin et al.

(10) Patent No.: US 7,491,785 B2
(45) Date of Patent: Feb. 17, 2009

(54) MULTI-FUNCTIONAL CYCLIC SILICATE COMPOUND, SILOXANE-BASED POLYMER PREPARED FROM THE COMPOUND AND PROCESS OF PRODUCING INSULATING FILM USING THE POLYMER

(75) Inventors: Hyeon Jin Shin, Gyeonggi-Do (KR); Hyun Dam Jeong, Gyeonggi-Do (KR); Jong Back Seon, Gyeonggi-Do (KR); Kwang Hee Lee, Gyeonggi-Do (KR); Sang Kook Mah, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/841,553

(22) Filed: May 10, 2004

(65) Prior Publication Data

US 2005/0080214 A1    Apr. 14, 2005

(30) Foreign Application Priority Data

Oct. 9, 2003    (KR) .................. 10-2003-0070193

(51) Int. Cl.
*C08G 77/08* (2006.01)
*C08G 77/18* (2006.01)

(52) U.S. Cl. .......................... 528/37; 528/39
(58) Field of Classification Search .............. 528/37, 528/39
See application file for complete search history.

(56) References Cited

U.S. PATENT DOCUMENTS

| | | | |
|---|---|---|---|
| 3,615,272 A | 10/1971 | Collins et al. | |
| 4,077,994 A * | 3/1978 | Davies et al. | 556/455 |
| 4,399,266 A | 8/1983 | Matsumura et al. | |
| 4,756,977 A | 7/1988 | Haluska et al. | |
| 4,824,985 A * | 4/1989 | Goodwin et al. | 556/460 |
| 4,999,397 A | 3/1991 | Weiss et al. | |
| 5,010,159 A | 4/1991 | Bank et al. | |
| 5,378,790 A | 1/1995 | Michalczyk et al. | |
| 5,491,108 A * | 2/1996 | Suzuki et al. | 438/626 |
| 5,853,808 A | 12/1998 | Arkles et al. | |
| 6,000,339 A | 12/1999 | Matsuzawa | |
| 6,166,237 A * | 12/2000 | Simandan et al. | 556/470 |
| 6,232,424 B1 | 5/2001 | Zhong et al. | |
| 6,660,822 B2 | 12/2003 | Lyu et al. | |
| 2001/0041458 A1* | 11/2001 | Ikakura et al. | 438/778 |

FOREIGN PATENT DOCUMENTS

EP    0 997 497 A1    5/2000

* cited by examiner

*Primary Examiner*—Margaret G Moore
(74) *Attorney, Agent, or Firm*—Harness, Dickey & Pierce, P.L.C.

(57) ABSTRACT

A multi-functional cyclic silicate compound, a siloxane-based polymer prepared from the silicate compound and a process of producing an insulating film using the siloxane-based polymer. The silicate compound of the present invention is highly compatible with conventional pore-generating substances and hardly hygroscopic, so it is useful for the preparation of a siloxane-based polymer suitable to a SOG process. Furthermore, a film produced by the use of such siloxane-based polymer is excellent in mechanical properties, thermal stability and crack resistance and enhanced in insulating properties by virtue of its low hygroscopicity. Therefore, in the field of semiconductor production, this film is of great use as an insulating film.

7 Claims, No Drawings

MULTI-FUNCTIONAL CYCLIC SILICATE COMPOUND, SILOXANE-BASED POLYMER PREPARED FROM THE COMPOUND AND PROCESS OF PRODUCING INSULATING FILM USING THE POLYMER

BACKGROUND OF THE INVENTION

This non-provisional application claims priority under 35 U.S.C. § 119(a) on Korean Patent Application No. 2003-70193 filed on Oct. 9, 2003, which is herein incorporated by reference.

1. Field of the Invention

The present invention relates to a multi-functional cyclic silicate compound, a siloxane-based polymer prepared from the silicate compound and a process of producing an insulating film using the siloxane-based polymer. More specifically, the present invention relates to a multi-functional cyclic silicate compound capable of being converted into a polymer of low hygroscopicity and excellent mechanical properties, a siloxane-based polymer prepared from the silicate compound and a process of producing an insulating film using the siloxane-based polymer.

2. Description of the Related Art

As the degree of integration in semiconductor devices increase, the R(resistance)×C(capacitance) delay also increases, resulting in serious problems such as signaling transfer delays. Thus, how to reduce the capacitance of an interlayer insulating film has been a matter of great concern in the field of semiconductor production technology, and various attempts have been made to develop low dielectric materials for use in the production of enhanced insulating films.

For example, U.S. Pat. Nos. 3,615,272; 4,399,266; 4,756,977; and 4,999,397 disclose insulating films produced by spin on deposition (SOD) using polysilsesquioxanes with a dielectric constant of about 2.5~3.1 instead of $SiO_2$ with a dielectric constant of 4.0 and deposited by chemical vapor deposition (CVD). Also, hydrogensilsesquioxanes as well as methods for their preparation are well known in the art. For example, U.S. Pat. No. 3,615,272 discloses a method of preparing a completely condensed, soluble hydrogensilsesquioxane, which comprises the steps of condensing trichloro-, trimethoxy- and triacetoxy- silanes in a sulfuric acid medium and then washing the resulting resin with water or aqueous sulfuric acid. U.S. Pat. No. 5,010,159 also discloses a method of synthesizing a condensed hydrogensilsesquioxane resin, which comprises the steps of hydrolyzing hydrosilanes in an arylsulfuric acid hydrate-containing hydrolysis medium and then contacting the resulting resin with a neutralizing agent. U.S. Pat. No. 6,232,424 describes a highly soluble silicone resin composition very stable in solution, which is prepared by hydrolyzing and polycondensing tetraalkoxysilane, organosilane and organotrialkoxysilane monomers in the presence of water and an appropriate catalyst. U.S. Pat. No. 6,000,339 teaches that a silica-based compound, having improved oxygen plasma-resistance, physical properties and thickness of a coating film, can be obtained from the reaction of a monomer selected from the group consisting of an alkoxysilane, a fluorine-containing alkoxysilane and an alkylalkoxysilane and a titanium- or zirconium-alkoxide compound, in the presence of water and an appropriate catalyst. U.S. Pat. No. 5,853,808 discloses that siloxane- and silsesquioxane-based polymers useful for producing $SiO_2$-rich ceramic coatings can be obtained from the hydrolysis and polycondensation of organosilanes possessing a β-substituted alkyl group. On the other hand, EP 0 997 497 A1 discloses that the hydrolysis and polycondensation of a certain combination of alkoxysilanes including mono-, di-, tri- and tetra-alkoxysilanes as well as trialkoxysilane dimers can provide useful insulating materials. Meanwhile, U.S. Pat. No. 5,378,790 discloses inorganic/organic hybrid materials with excellent physical properties. U.S. Pat. No. 6,660,822 discloses a siloxane-based resin composition obtained from the hydrolysis and polycondensation of circular siloxane monomers and thin insulating films produced from such a composition.

However, insulating films produced using these prior siloxane-based resins cannot achieve a satisfactory low dielectric constant, or they are deficient in mechanical properties and contain excessive carbon even if they have a low dielectric constant. In particular, polymers prepared from a Si compound of Q structure, such as tetramethoxysilane, have good mechanical properties, but their high dielectric constant, due to their inherent strong hygroscopicity, inhibits their use in the production of insulating films, more particularly in the production of insulating films through the SOD process. Recently, siloxane-based resins are required to possess good compatibility with pore-generating substances, usually used for the purpose of further lowering the insulating coefficient thereof.

Consequently, there is a need for developing novel insulating materials that can be applied to the SOD process to provide insulating films with low insulating coefficients and good mechanical properties but also are compatible with pore-generating substances.

SUMMARY OF THE INVENTION

The present invention is directed to providing a multi-functional silicate compound with a particular structure.

Another feature of the present invention is to provided polymers and copolymers prepared from the multi-functional silicate compounds, said polymers and copolymers having excellent mechanical properties and high porosity and furthermore maintain low hygroscopicity with the SOG (Spin On Glass) process whereby they can provide insulating films which are improved in insulating properties, mechanical properties, thermal stability and crack-resistance compared to the prior art.

Still another feature of the present invention is to provide a siloxane-based polymer or copolymer prepared from the multi-functional silicate compounds.

A further feature of the present invention is to provide insulating films and a process of producing insulating films using the siloxane-based polymers or copolymers of the present invention.

In accordance with the present invention, there is provided a multi-functional cyclic silicate compound of formula (1), below:

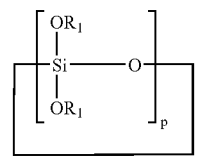

(1)

wherein, $R_1$ is a hydrogen atom, a $C_{1-3}$ alkyl group, R'CO (wherein, R' is a $C_{1-3}$ alkyl group) or $SiX_1X_2X_3$(wherein, each of $X_1$, $X_2$ and $X_3$ is, independently, a hydrogen atom, a $C_{1-3}$ alkyl group, a $C_{1-10}$ alkoxy group or a halogen atom, provided that at least one of them is hydrolysable); and p is an integer from 3 to 8.

The present invention also provides a siloxane-based polymer prepared by hydrolyzing and polycondensing the multi-functional cyclic silicate compound of formula (1) alone or in combination with at least one monomer selected from the group consisting of the compounds of formulae (2)-(5), in an organic solvent in the presence of an acid or base catalyst and water:

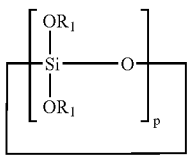
(1)

wherein,
$R_1$ is a hydrogen atom, a $C_{1-3}$ alkyl group, R'CO (wherein, R' is a $C_{1-3}$ alkyl group) or $SiX_1X_2X_3$ (wherein, each of $X_1$, $X_2$ and $X_3$ is, independently, a hydrogen atom, a $C_{1-3}$ alkyl group, a $C_{1-10}$ alkoxy group or a halogen atom, provided that at least one of them is hydrolysable); and
p is an integer from 3 to 8;

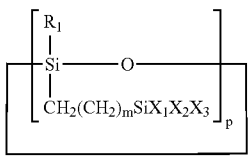
(2)

wherein,
$R_1$ is a hydrogen atom, a $C_{1-3}$ alkyl group or a $C_{6-15}$ aryl group;
each of $X_1$, $X_2$ and $X_3$ is, independently, a $C_{1-3}$ alkyl group, a $C_{1-10}$ alkoxy group or a halogen atom, provided that at least one of them is hydrolysable;
m is an integer from 0 to 10; and
p is an integer from 3 to 8;

$X_3X_2X_1Si$-M-$SiX_1X_2X_3$ (3)

wherein,
each of $X_1$, $X_2$ and $X_3$ is, independently, a $C_{1-3}$ alkyl group, a $C_{1-10}$ alkoxy group or a halogen atom, provided that at least one of them is hydrolysable; and
M is a $C_{1-10}$ alkylene group or a $C_{6-15}$ arylene group;

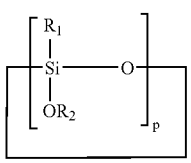
(4)

wherein,
$R_1$ is a hydrogen atom, a $C_{1-3}$ alkyl group or a $C_{6-15}$ aryl group;
$R_2$ is a hydrogen atom, a $C_{1-3}$ alkyl group, R'CO (wherein, R' is a $C_{1-3}$ alkyl group) or $SiX_1X_2X_3$ (wherein, each of $X_1$, $X_2$ and $X_3$ is, independently, a hydrogen atom, a $C_{1-3}$ alkyl group, a $C_{1-10}$ alkoxy group or a halogen atom, provided that at least one of them is hydrolysable); and
p is an integer from 3 to 8; and

$(R_1)_nSi(OR_2)_{4-n}$ (5)

wherein,
each of $R_1$ and $R_2$ is, independently, a hydrogen atom, a $C_{1-3}$ alkyl group, a $C_{6-15}$ aryl group or halogen atom, provided that at least one of them is hydrolysable; and
n is an integer from 0 to 3.

In accordance with another feature of the present invention, there is provided a process of producing an interlayer insulating film of a semiconductor, the process including the steps of: (i) providing a liquid coating composition by dissolving the above siloxane-based polymer optionally with a pore-generating material in an organic solvent; and (ii) applying the liquid coating composition to a substrate and heat-curing.

In accordance with another feature of the present invention, there is provided an insulating film produced by the above process.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Hereinafter, the present invention will be described in greater detail.

Multi-functional Cyclic Silicate Compound

The silicate compound of the present invention, represented by the formula (1) below, has multiple functional groups, forming a more stable Q structure than any of the previously known silicate compounds:

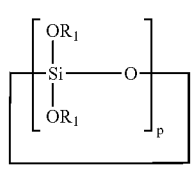
(1)

wherein,
$R_1$ is a hydrogen atom, a $C_{1-3}$ alkyl group, R'CO (wherein, R' is a $C_{1-3}$ alkyl group) or $SiX_1X_2X_3$ (wherein, each of $X_1$, $X_2$ and $X_3$ is, independently, a hydrogen atom, a $C_{1-3}$ alkyl group, a $C_{1-10}$ alkoxy group or a halogen atom, provided that at least one of them is hydrolysable); and
p is an integer from 3 to 8.

The polymerization of the silicate compound alone or the copolymerization thereof with an appropriate cyclic or linear siloxane- or silane-based monomer yields (co)polymers having good insulating and mechanical properties, rendering them favorable materials for use in insulating films. Moreover, the (co)polymers are very compatible with conventional pore-generating substances (hereinafter, referred to as "porogen") so that, if necessary, they can be used in combination with porogens to further reduce the dielectric constant of final insulating films.

A preferable example of the silicate compound of the present invention can be represented by the following formula (6), which corresponds to the above formula (1) wherein $R_1$ is methyl and n is 4:

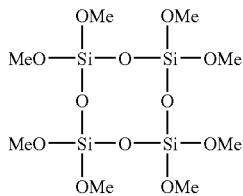
(6)

In the compound of formula (6), each Si forms a Q structure as in tetramethoxysilane (TMOS) of the following formula (7):

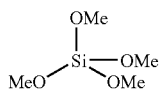
(7)

Accordingly, 1 mol of the compound of formula (6) has an effect equivalent to 4 mol of TMOS, and the polymerization of the compound can yield a polymer which is significantly improved in mechanical properties. Furthermore, the compound of the formula (6) has a lower hygroscopicity than TMOS and thus can be applied to the SOG process, whereas TMOS cannot be applied to the SOG process due to high hygroscopicity.

Siloxane-based Polymer

The siloxane-based polymer of the present invention can be obtained by hydrolyzing and polycondensing the multifunctional cyclic silicate compound of the above formula (1) in an organic solvent in the presence of an acid or base catalyst and water, optionally with at least one cyclic or linear siloxane- or silane-based monomer selected from the group consisting of the compounds of the formulae (2)-(5) below.

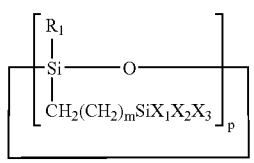
(2)

wherein, $R_1$ is a hydrogen atom, a $C_{1-3}$ alkyl group or $C_{6-15}$ aryl group;

each of $X_1$, $X_2$ and $X_3$ is, independently, a $C_{1-3}$ alkyl group, a $C_{1-10}$ alkoxy group or a halogen atom, provided that at least one of them is hydrolysable;

m is an integer from 0 to 10; and p is an integer from 3 to 8;

$$X_3X_2X_1Si\text{-}M\text{-}SiX_1X_2X_3 \quad (3)$$

wherein, each of $X_1$, $X_2$ and $X_3$ is, independently, a $C_{1-3}$ alkyl group, a $C_{1-10}$ alkoxy group or a halogen atom, provided that at least one of them is hydrolysable; and M is a $C_{1-10}$ alkylene group or $C_{6-15}$ arylene group;

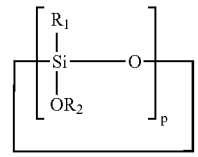
(4)

wherein, $R_1$ is a hydrogen atom, a $C_{1-3}$ alkyl group or a $C_{6-15}$ aryl group;

$R_2$ is a hydrogen atom, a $C_{1-3}$ alkyl group, R'CO (wherein, R' is a $C_{1-3}$ alkyl group) or $SiX_1X_2X_3$ (wherein, each of $X_1$, $X_2$ and $X_3$ is, independently, a hydrogen atom, a $C_{1-3}$ alkyl group, a $C_{1-10}$ alkoxy group or a halogen atom, provided that at least one of them is hydrolysable); and p is an integer from 3 to 8; and $$(R_1)_nSi(OR_2)_{4-n} \quad (5)$$

wherein, each of $R_1$ and $R_2$ is, independently, a hydrogen atom, a $C_{1-3}$ alkyl group, a $C_{6-15}$ aryl group or a halogen atom, provided that at least one of them is hydrolysable; and n is an integer from 0 to 3.

Preferably, the compound of formula (2) can be exemplified by the compound of formula (8) below:

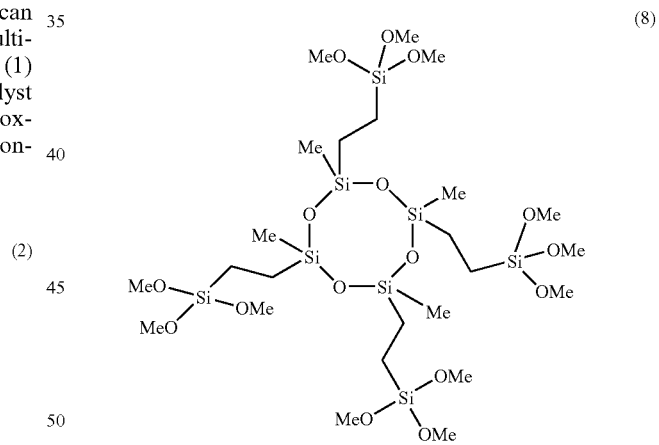
(8)

Preferably, the compound of formula (3) can be exemplified by the compound of formula (9) below:

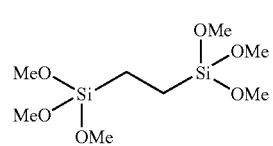
(9)

Preferably, the compound of formula (4) can be exemplified by the compounds of formulae (10)-(13) below:

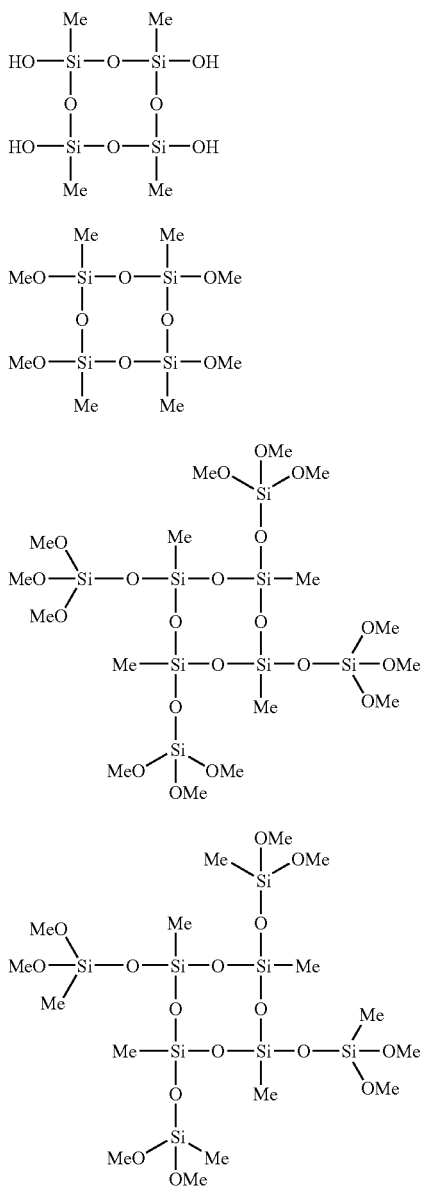

Preferably, the compound of formula (5) can be exemplified by the compounds of formulae (7) and (14) below:

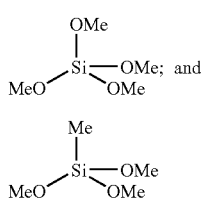

The polymerization of TMOS yields polymers of random structure, but the exclusive polymerization of the cyclic silicate compound of formula (1) advantageously yields those of regular structure.

On the other hand, in case of copolymerizing the cyclic silicate compound of formula (1) with a monomer of formulas (2) and (3), the monomer should have one or more hydrolysable functional groups (e.g. Si—OH or Si—OMe) in its side chain so that the resulting copolymer can be evenly mixed with a porogen and so that the formation of a network by crosslinking proceeds favorably to provide an insulating film of predominant mechanical properties including toughness and modulus. Additionally, the monomer of formulas (2) and (3) contains organic bridges, which produce vacant spaces in the course of polymerization, and therefore, the resulting copolymers have high elasticity as well as significantly increased molecular porosity conferring excellent insulating properties on the copolymer.

In the case where the cyclic silicate compound of formula (1) is copolymerized with a monomer of formula (4), copolymers are produced which are less hygroscopic and have a ladder-like structure. Similarly, in case of copolymerizing the cyclic silicate compound of formula (1) with a monomer of formula (5), the hygroscopicity of the resulting polymer can be reduced.

In the case where the cyclic silicate compound of formula (1) is copolymerized with another monomer, the molar ratio of the monomers is not specifically limited but rather determined, depending on the properties required of the final insulating film. For example, in the case of copolymerizing the cyclic silicate compound of formula (1) with at least one monomer selected from the group consisting of the compounds of formulae (2)-(5), the molar ratio of the former and the latter may range from 0.01:99.99 to 99.99:0.01. If necessary, two or more monomers selected from the group consisting of the compounds of formulas (2)-(5) can be copolymerized with the cyclic silicate compound of formula (1) to provide ternary and over copolymers.

Preferred organic solvents used in the preparation of the siloxane-based polymers of the present invention can be exemplified by, but are not limited to, aliphatic hydrocarbon solvents such as hexane and heptane; aromatic hydrocarbon solvents such as anisol, mesitylene and xylene; ketone-based solvents such as methyl isobutyl ketone, 1-methyl-2-pyrrolidinone, cyclohexanone and acetone; ether-based solvents such as tetrahydrofuran and isopropyl ether; acetate-based solvents such as ethyl acetate, butyl acetate and propylene glycol methyl ether acetate; alcohol-based solvents such as isopropyl alcohol and butyl alcohol; amide-based solvents such as dimethylacetamide and dimethylformamide; silicon-based solvents; and mixtures thereof.

Non-limiting examples of the catalyst used in the preparation of the siloxane-based polymers of the present invention include every known acid and base catalysts available for the preparation of polysilsesquioxanes. Hydrochloric acid, nitric acid, benzene sulfonic acid, oxalic acid and formic acid are preferred acid catalysts and potassium hydroxide, sodium hydroxide, triethylamine, sodium bicarbonate and pyridine are preferred base catalysts.

When preparing the siloxane-based polymers of the present invention, the molar ratio of the total monomers to be polymerized and the catalyst should range from $1:1\times10^{-5}$ to 1:10, and the molar ratio of the total monomers to be polymerized and water should ranges from 1:1 to 1:100.

According to the present invention, the reaction temperature and time of hydrolysis and polycondensation can be controlled appropriately, but they are preferably performed at 0-200° C. for 0.1-100 hrs.

Preferably, the siloxane-based polymers thus prepared have a Mw of 3,000-300,000, and the Si—OH content of the total terminal groups is 5 mol % or more.

Process of Producing an Insulating Film

The present invention further provides a process of producing an insulating film, the process including the steps of: (i) providing a liquid coating composition by dissolving the inventive siloxane-based polymer in an organic solvent, optionally together with a porogen; and (ii) applying the liquid coating composition to a substrate and heat-curing.

In the present invention, any of the known porogens available for the preparation of a porous insulating film can be used. Preferably, one or more porogens can be used which are selected from cyclodextrin, polycaprolactone, Brij-based surfactant, polyethyleneglycol-polypropyleneglycol-polyethyleneglycol triblock copolymer surfactant, and derivatives thereof. The porogen content of the liquid coating composition is preferably 0-70 wt % based on total weight of the solid matter (inclusive of the siloxane-base polymer and the porogen) in the composition.

The organic solvent used in the preparation of the liquid coating composition is not specifically limited but can be one or more selected from those described above as polymerization solvents. The solid matter content of the liquid coating composition is not specifically limited but is preferably 5-70 wt % based on the total weight of the composition.

In the present invention, the substrate is not specifically limited and any known substrate such as a glass substrate, a silicon wafer and a plastic substrate can be used depending on the desired use. Non-limiting examples of the method of applying the liquid coating composition to a substrate include spin-coating, dip-coating, spray-coating, flow-coating and screen-printing, although spin-coating is most preferred in consideration of convenience and evenness. For spin-coating, the spin rate is controlled to fall in the range of 800 and 5,000 rpm.

At the completion of the coating, the resulting coating film may be dried by evaporating the organic solvent. This film-drying step can be carried out by exposing the coated substrate to the environmental atmosphere or to vacuum conditions at the beginning of the subsequent heat-curing step or to mild heating at 200° C. or less.

Subsequently, the coating film is cured by heating at 150-600° C., preferably at 200-450° C. for 1-180 minutes to produce an insoluble, crack-free film. As used herein, by "crack-free film" is meant a film without any crack being observed with an optical microscope at a magnification of 1000×. As used herein, by "insoluble film" is meant a film substantially insoluble in any solvent described as being useful for the preparation of the liquid coating composition.

The insulating film containing only the siloxane-based polymer of the present invention has a low dielectric constant of 3.0 or less so that it can be used as an interlayer, low dielectric coating film in a semiconductor. An insulating film containing the siloxane-based polymer of the present invention and the porogen has a dielectric constant of 2.5 or less. Insulating films produced according to the present invention are excellent in mechanical properties such as tensile strength and elasticity and furthermore have a low carbon content, so that they are useful as an interlayer insulating film of a semiconductor.

The present invention will be more clearly understood by referring to the following examples. It should be understood that the following examples are not intended to restrict the scope of the present invention in any manner.

EXAMPLES

Evaluation of the properties of the insulating films obtained from the following examples is performed as follows:

1) Dielectric Constant:

A P-type silicon wafer doped with boron is coated with a 3000 Å-thick thermally-oxidized silicon film, followed by the sequential deposition of a 100 Å-thick titanium layer, a 2000 Å-thick aluminum layer and a 100 Å-thick titanium layer using a metal evaporator. On the top of the metal layer is formed an insulating film to be evaluated. Subsequently, on the insulating film is deposited a circular electrode 1 mm in diameter by the use of a hard mask, the electrode consisting of a 100 Å-thick titanium layer and a 5000 Å-thick aluminum layer, so as to provide a test piece of a MIM (metal-insulator-metal) structure.

The test piece thus prepared is subjected to the measurement of capacitance at a frequency of 10 kHz, 100 kHz and 100 MHz using PRECISION LCR METER(HP4284A) with Micromanipulator 6200 probe station. The dielectric constant of the inventive insulating film is calculated from the following equation, wherein the "d" value is obtained by the use of a prism coupler:

$$k=(C \times d)/(\in_o \times A)$$

Note) k: relative permittivity
C: capacitance
$\in_o$: dielectric constant in vacuum
($\in_o 8.8542 \times 10^{-12}$ Fm$^{-1}$)
d: thickness of the insulating film
A: contact area of the electrode.

2) Hardness and Elastic Modulus:

The hardness and elastic modulus of the inventive insulating film are determined by the use of Nanoindenter II (MTS Co.). At this time, indentation of the insulating film is performed until the indentation depth reaches 10% of its whole thickness. The thickness of the insulating film is previously measured by the use of a prism coupler. In the present invention, to guarantee the reliability of the measurement, 9 points are indented every test piece and then the mean hardness and modulus are taken.

3) Carbon Content:

Carbon content of the inventive insulating film is determined in the manner of XPS(X-ray photoelectron spectroscopy) using Q 2000(Physical Electronics Co.). At this time, the monochromatic Al source (1486.6 eV) is used for X-ray generating. Sputtering of the insulating film is performed by the use of 3 keV Ar ion, and the quantitative element analysis according to depth is performed. The mean carbon content is taken from an area over which content of each element is consistent.

Synthesis of Monomers

1) Synthesis of a Multi-functional Cyclic Silicate Compound:

To a well-dried flask are introduced 31.5 mmol (25.0 g) of octaphenyl tetracyclosiloxane and 37.4 mmol (5.0 g) of aluminum chloride and dissolved in benzene. Then, bubbling with HCl gas is performed until the solution is saturated, and the reaction is continued at room temperature for 12 hrs. At the completion of the reaction, bubbling with N$_2$ gas is performed so as to remove excessive HCl, and the reaction mixture is neutralized with triethyl amine to a pH of 7. Subsequently, the reaction mixture is diluted with excessive methanol and triethylamine and filtrated through celite. The filtrate is left under reduced pressure of about 0.1 torr for the purpose of concentrating it through the evaporation of any volatile substances. After adding 100 ml of diethyl ether to the concentrate followed by stirring for 1 hr, it is filtrated through celite. To the filtrate is added 5 g of activated carbon and stirred for 10 hrs, followed by filtration through celite. From the filtrate hexane is evaporated under a reduced pressure of about 0.1 torr to produce the compound of the following formula (6):

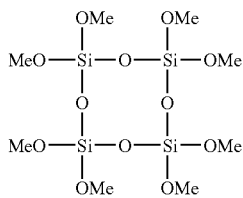

(6)

The results of NMR analysis of the compound thus obtained are as follows:

$^1$H-NMR (300 MHz, in acetone-$d_6$): δ3.58 (s, 24H, 8×[—OCH$_3$]).

(2) Synthesis of Cyclic Siloxane-based Monomer (A) Possessing Organic Bridges:

To a flask are introduced 10.0 g(29.01 mmol) of 2,4,6,8-tetramethyl-2,4,6,8-tetravinylcyclotetrasiloxane and 0.164 g of platinum (O)-1,3-divinyl-1,1,3,3-tetramethyldisiloxane complex solution in xylene and diluted with 300 ml of diethylether. After cooling the reaction mixture down to −78° C., 17.29 g(127.66 mmol) of trichlorosilane is slowly added thereto. At the completion of the addition, the reaction mixture is slowly warmed up to room temperature. The reaction is continued at room temperature for 40 hrs, and volatile substances are removed from the reaction mixture under reduced pressure of about 0.1 torr to produce a concentrate. Subsequently, to the concentrate is added 100 ml of hexane and stirred for 1 hr, followed by filtration through celite. Hexane is evaporated from the filtrate under reduced pressure of about 0.1 torr to produce a liquid product.

10.0 g (11.56 mmol) of the liquid product obtained above is diluted with 50 ml of THF (tetrahydrofuran), and 13.83 g (136.71 mmol) of triethylamine is added thereto. After cooling the reaction mixture down to −78° C., 4.38 g(136.71 mmol) of methyl alcohol is slowly added thereto. At the completion of the addition, the reaction mixture is slowly warmed up to room temperature. The reaction is continued at room temperature for 15 hrs and filtered through celite. The volatile substances are evaporated from the filtrate under a reduced pressure of about 0.1 torr to produce a concentrate. To the concentrate is added 100 ml of hexane and stirred for 1 hr, followed by filtration through celite. To the filtrate is added 5 g of activated carbon and stirred for 10 hrs, followed by filtration through celite. Hexane is evaporated from the filtrate under a reduced pressure of about 0.1 torr to produce a concentrated liquid colorless monomer (A) of the following formula:

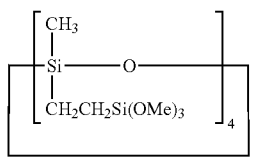

The results of NMR analysis of the monomer (A) thus obtained are as follows:

$^1$H-NMR (300 MHz, in acetone-$d_6$): δ 0.09 (s, 12H, 4×[—CH$_3$]), 0.52~0.64 (m, 16H, 4×[—CH$_2$CH$_2$—]), 3.58 (s, 36H, 4×[—OCH$_3$]$_3$).

(3) Synthesis of Cyclic Siloxane-based Monomer (B-1):

To a flask is introduced 10.00 g (41.6 mmol) of 2,4,6,8-tetramethyl-2,4,6,8-cyclotetrasiloxane and diluted with 100 ml of THF. To the solution is added 200 mg of 10 wt % Pd/C(palladium/charcol) and 3.20 ml (177.8 mmol) of deionized water, while removing hydrogen gas. Thereafter, the reaction is continued at room temperature for 15 hrs and then filtrated through celite and MgSO$_4$. From the filtrate are evaporated volatile substances under a reduced pressure of 0.1 torr to produce the concentrated liquid colorless monomer (B-1) of the following formula:

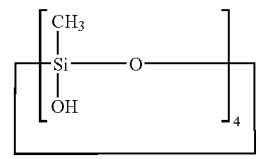

The results of the NMR analysis of the monomer (B-1) thus obtained are as follows:

$^1$H-NMR (300 MHz, in acetone-$d_6$): δ 0.067 (s, 12H, 4×[—CH$_3$]), 5.52(s, 4H, 4×[—OH]).

4) Synthesis of Cyclic Siloxane-based Monomer (B-2):

Except for the fact that 2,4,6,8-tetramethyl-2,4,6,8-cyclotetrasiloxane is replaced with 2,4,6,8,10-pentamethyl-2,4,6,8,10-cyclopentasiloxane, the procedure of the Synthesis of Example 4) is performed in the same manner as in above Synthesis Example 3) to produce monomer (B-2) of the following formula:

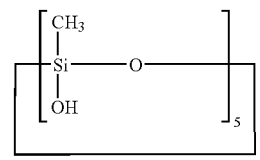

The results of the NMR analysis of the monomer (B-2) thus obtained are as follows:

$^1$H-NMR (300 MHz, in acetone-$d_6$): δ0.092 (s, 15H, 5×[—CH$_3$]), 5.71 (s, 5H, 5×[—OH]).

(5) Synthesis of Cyclic Siloxane-based Monomer (B-3):

To a flask is introduced 3.8 g(21.4 mmol) of PdCl$_2$(II) and dissolved in 100 ml of CCl$_4$. After slowly adding 10.00 g(41.6 mmol) of 2,4,6,8-tetramethyl-2,4,6,8-cyclotetrasiloxane to the solution, the reaction is continued at room temperature for 10 minutes, followed by filtration through celite and MgSO$_4$. From the filtrate are evaporated volatile substances under a reduced pressure of 0.1 torr to produce the concentrated liquid monomer (B-3) of the following formula:

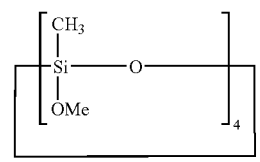

The results of the NMR analysis of the monomer (B-3) thus obtained are as follows:

$^1$H-NMR (300 MHz, in acetone-d$_6$): δ 0.067 (s, 12H, 4×[—CH$_3$]), 3.55 (s, 3H, 4×[—OCH$_3$]).

6) Synthesis of Cyclic Siloxane-based Monomer (B-4):

To a solution prepared by diluting 12.6 g (41.6 mmol) of the liquid monomer (B-1) obtained from the above Synthesis of Example 3) with 200 ml of THF is added 13.83 g (177.8 mmol) of triethylamine. After cooling the reaction mixture down to −0° C., 25.0 g(177.8 mmol) of chlorodimethoxymethylsilane is slowly added thereto. The reaction mixture is slowly warmed up to room temperature and then the reaction is continued for 15 hrs. At the completion of the reaction, the reaction mixture is filtrated through celite. From the filtrate are evaporated volatile substances under a reduced pressure of 0.1 torr to produce the concentrated liquid monomer (B-4) of the following formula:

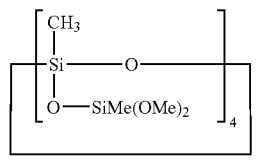

The results of the NMR analysis of the monomer (B-4) thus obtained are as follows:

$^1$H-NMR (300 MHz, in acetone-d$_6$):δ 0.12 (s, 12H, 4×[—CH$_3$]), 0.24 (s, 12H, 4×[—CH$_3$]), 3.53 (s, 24H, 4×[—OCH$_3$]$_2$).

7) Synthesis of the Cyclic Siloxane-based Monomer (B-5):

Except for the fact that chlorodimethoxymethylsilane is replaced with chlorotrimethoxysilane, the procedure of the Synthesis of Example 7) is performed according to the same manner as in the above Synthesis Example 6) to produce monomer (B-5) of the following formula:

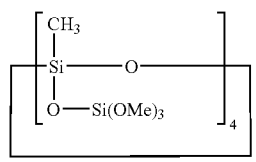

The results of the NMR analysis of the monomer (B-5) thus obtained are as follows:

$^1$H-NMR (300 MHz, in acetone-d$_6$): δ 0.092 (s, 12H, 4×[—CH$_3$]), 3.58 (s, 36H, 4×[—OCH$_3$]$_3$).

Production of Polymers (a-1) and (a-2)

The multi-functional cyclic silicate compound obtained from the above Synthesis Example 1) and the siloxane-based monomer (A) obtained from the above Synthesis Example 2) are respectively quantified, according to Table 1 below and introduced to a flask, followed by dilution with THF so that the final concentration of the solution could range from 0.05 to 0.07M. Subsequently, the solution is cooled down to −78° C., and HCl and deionized water are slowly added thereto in the amounts as described in Table 1. Then the reaction mixture is slowly warmed up to 70° C. The reaction is continued for 20 hrs and transferred to a separatory funnel. To the separatory funnel is introduced the same volume of diethylether and THF as that of THF used in the dilution of the monomers at the beginning of the reaction. After washing the reaction mixture with 1/10×volume of deionized water, volatile substances are evaporated therefrom under reduced pressure to produce a white powdery polymer. The powdery polymer is dissolved in acetone to produce a clear solution, followed by filtration through a 0.2 μm syringe filter. To the filtrate water is slowly added to precipitate a white powder. The white powder is recovered and dried at 5° C. under a reduced pressure of 0.1 torr for 10 hrs to produce desired siloxane-based polymers. Table 1 shows detailed amounts of monomers, acid catalyst and water used in the production of the respective polymers as well as amounts of the polymers thus obtained. The Si—OH, Si—OCH$_3$ and S$_1$—CH$_3$ content (%) of the polymers, determined by the use of a NMR device (Bruker Co.) and the following equations, is also presented:

Si—OH(%)=Area (Si—OH)×[Area (Si—OH)+Area (Si—OCH$_3$)/3+Area(Si—CH$_3$)/3]×100;

Si—OCH$_3$(%)=Area (Si—OCH$_3$)/3÷[Area (Si—OH)+Area(Si—OCH$_3$)/3+Area(Si—CH$_3$)/3]×100; and, Si—CH$_3$ (%)=Area (Si—CH$_3$)/3÷[Area (Si—OH)+Area (Si—OCH$_3$)/3+Area(Si—CH$_3$)/3]×100.

TABLE 1

| Polymer | Monomer(mmol) Silicate compound | Monomer (A) | HCl (mmol) | H$_2$O (mmol) | Polymer (g) | Si—OH (%) | Si—OCH$_3$ (%) | Si—CH$_3$ (%) |
|---|---|---|---|---|---|---|---|---|
| (a-1) | 5.89 | 5.89 | 0.14 | 417.15 | 1.14 | 68.90 | 0.00 | 31.10 |
| (a-2) | 3.53 | 8.24 | 0.14 | 470.75 | 3.01 | 60.90 | 0.00 | 39.10 |

Production of Polymer (a-3)

Polymer (a-3) is produced according to the same manner as in the production of polymer (a-1), except that monomer (A) is replaced with 16.48 mmol of 1,2-bis(trimethoxysilyl)ethane of formula 9 and 7.06 mmol of the multi-functional cyclic silicate compound, 1.84 mmol of HCl and 611.94 mmol of water are used. As a result, 3.80 g of polymer is obtained, and the Si—OH, Si—OCH$_3$ and S$_1$—CH$_3$ content (%) thereof is, respectively, 35.20%, 0.95% and 63.85%.

Production of Polymer (b-1)

Polymer (b-1) is produced according to the same manner as in the production of polymer (a-1), except that monomer (A) is replaced with monomer (B-1) and HCl and water are used in the amounts as described in Table 2 below. The amount of the polymer thus obtained is shown in Table 2 along with Si—OH, Si—OCH$_3$ and S$_1$—CH$_3$ content (%) thereof.

TABLE 2

| Polymer | Silicate compound | Monomer (mmol) (A) | HCl (mmol) | H₂O (mmol) | Polymer (g) | Si—OH (%) | Si—OCH₃ (%) | Si—CH₃ (%) |
|---|---|---|---|---|---|---|---|---|
| (b-1) | 3.53 | B-1 (8.24) | 0.42 | 141.19 | 1.20 | 40.00 | 3.50 | 56.50 |

Production of Polymer (c)

Polymer (c) is produced according to the same manner as the production of polymer (a-1), except that monomer (A) is replaced with 16.48 mmol of methyltrimethoxysilane and 7.06 mmol of the multi-functional cyclic silicate compound, 1.34 mmol of HCl and 477.16 mmol of water are used. As a result 2.50 g of polymer is obtained, and Si—OH, Si—OCH₃ and $S_1$—CH₃ content (%) thereof is, respectively, 32.10%, 1.05% and 66.85%.

Production of Insulating Film A-1

0.581 g of siloxane-based polymer (a-1) obtained above is dissolved in PGMEA (propylene glycol methyl ether acetate) along with 0.249 g of a porogen, heptakis(2,3,6-tri-O-methyl)-β-cyclodextrin so that the final concentration of the solid matter (inclusive of the polymer and the porogen) in the resulting liquid coating composition could amount to 30 wt %. The liquid coating composition is applied to a silicon wafer by spin-coating for 30 seconds while maintaining the spin rate of 3,000 rpm. Under a nitrogen atmosphere, the coated wafer is put on a hot plate and preheated for 1 minute at 150° C. and for another minute at 250° C. to produce a dried coating film. Under vacuum condition, the temperature of the coating film is elevated up to 420° C. at a rate of 3° C./min, where the film is subjected to heat-curing for 1 hr to produce the insulating film A-1. The insulating film is analyzed for thickness, refractive index, dielectric constant, hardness, elastic modulus and carbon content, and the results are shown in Table 3 below.

Production of Insulating Films A-3, B-1 and C

Each of insulating films A-3, B-1 and C is produced according to the same manner as in the production of insulating film A-1, except that polymer (a-1) is replaced with (a-3), (b-1) and (c), respectively. The insulating films are analyzed for thickness, refractive index, dielectric constant, hardness, elastic modulus and carbon content, and the results are shown in Table 3 below.

TABLE 3

| Insulating film | R.I.[1] | T[2] (Å) | D.C.[3] | H[4] (GPa) | E.M.[5] (GPa) | C.C.[6] (%) |
|---|---|---|---|---|---|---|
| A-1 | 1.324 | 13132 | 2.31 | 0.52 | 3.81 | 29.0 |
| A-3 | 1.330 | 9756 | 2.23 | 0.49 | 3.53 | 13.0 |
| B-1 | 1.275 | 6083 | 2.04 | 0.39 | 2.80 | 12.0 |
| C | 1.285 | 8695 | 2.19 | 0.35 | 2.72 | 12.5 |

[1] refractive index
[2] thickness
[3] dielectric constant
[4] hardness
[5] elastic modulus
[6] carbon content Although the preferred embodiments of the present invention have been disclosed for illustrative purposes, those skilled in the art will appreciate that various modifications, additions and substitutions are possible, without departing from the spirit and scope of the invention.

What is claimed is:

1. A siloxane-based polymer prepared by hydrolyzing and polycondensing the multi-functional cyclic silicate compound of formula (1) in combination with at least one monomer selected from the group consisting of the compounds of formulae (2)-(5), in an organic solvent in the presence of an acid or base catalyst and water:

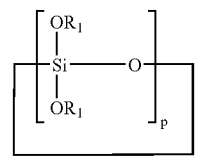

(1)

wherein,
$R_1$ is a hydrogen atom, a $C_{1-3}$ alkyl group, R'CO (wherein, R' is a $C_{1-3}$ alkyl group) or $SiX_1X_2X_3$ (wherein, each of $X_1$, $X_2$ and $X_3$ is, independently, a halogen atom); and p is an integer from 3 to 8;

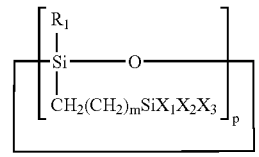

(2)

wherein,
$R_1$ is a hydrogen atom, a $C_{1-3}$ alkyl group or a $C_{6-15}$ aryl group;
each of $X_1$, $X_2$ and $X_3$ is, independently, a $C_{1-3}$ alkyl group, a $C_{1-10}$ alkoxy group or a halogen atom, provided that at least one of them is hydrolysable;
m is an integer from 0 to 10; and
p is an integer from 3 to 8;

$$X_3X_2X_1Si\text{-}M\text{-}SiX_1X_2X_3 \qquad (3)$$

wherein,
each of $X_1$, $X_2$ and $X_3$ is, independently, a $C_{1-3}$ alkyl group, a $C_{1-10}$ alkoxy group or a halogen atom, provided that at least one of them is hydrolysable; and
M is a $C_{1-10}$ alkylene group or a $C_{6-15}$ arylene group;

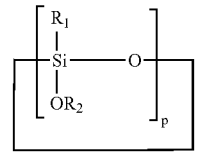

(4)

wherein, $R_1$ is a hydrogen atom, a $C_{1-3}$ alkyl group or a $C_{6-15}$ aryl group;

$R_2$ is a hydrogen atom, a $C_{1-3}$ alkyl group or a $C_{6-15}$ aryl group; R'CO (wherein, R' is a $C_{1-3}$ alkyl group) or $SiX_1X_2X_3$ (wherein, each of $X_1$, $X_2$ and $X_3$ is, independently, a hydrogen atom, a $C_{1-3}$ alkyl group, a $C_{1-10}$ alkoxy group or a halogen atom, provided that at least one of them is hydrolysable); and p is an integer from 3 to 8; and

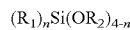 (5)

wherein, $R_1$ is, independently, a hydrogen atom, a $C_{1-3}$ alkyl group, a $C_{6-15}$ aryl group or a halogen atom;

$R_2$ is, independently, a hydrogen atom, a $C_{1-3}$ alkyl group or a $C_{6-15}$ aryl group; and n is an integer from 0 to 3, wherein the polymer has a Mw of 3,000-300,000.

2. The siloxane-based polymer according to claim 1, wherein the silicate compound is specified as a compound of formula (6):

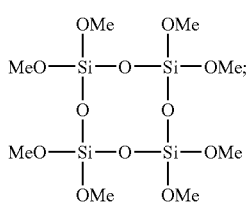 (6)

the compound of formula (2) is specified as a compound of formula (8):

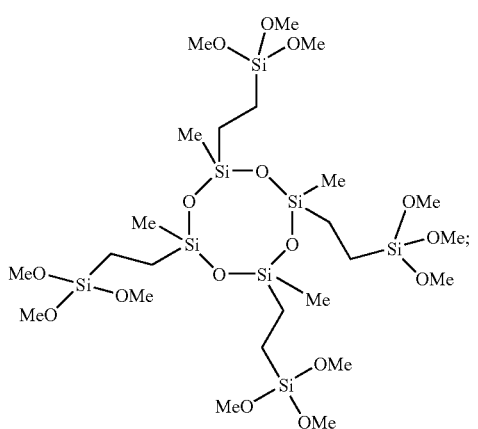 (8)

the compound of formula (3) is specified as a compound of formula (9):

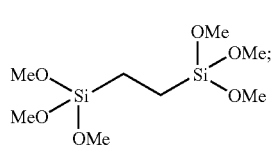 (9)

the compound of formula (4) is specified as a compound of formulae (10)-(13):

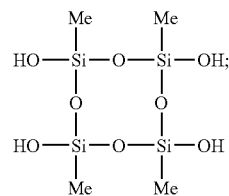 (10)

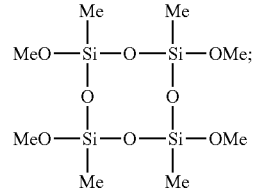 (11)

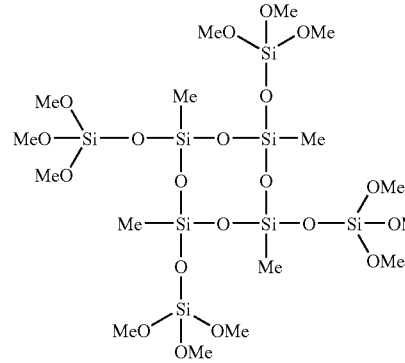 (12)

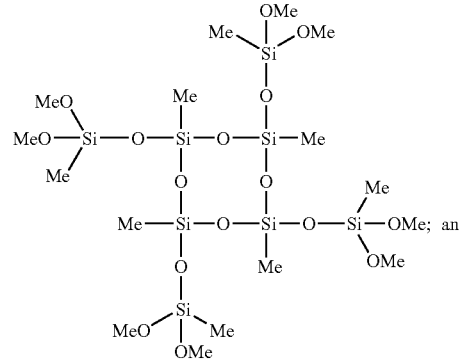 (13)

the compound of formula (5) is specified as a compound of formulae (7) and (14):

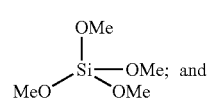 (7)

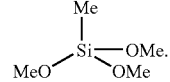 (14)

3. The siloxane-based polymer according to claim 1, wherein the acid catalyst is hydrochloric acid, nitric acid, benzene sulfonic acid, oxalic acid, formic acid or a mixture thereof, and the base catalyst is potassium hydroxide, sodium hydroxide, triethylamine, sodium bicarbonate, pyridine or a mixture thereof.

4. The siloxane-based polymer according to claim 1, wherein the molar ratio of total monomers to be polymerized and the acid or base catalyst ranges from $1:1\times10^{-5}$ to 1:10.

5. The siloxane-based polymer according to claim 1, wherein molar ratio of total monomers to be polymerized and the water ranges from 1:1 to 1:100.

6. The siloxane-based polymer according to claim 1, wherein the hydrolysis and the polycondensation or copolymerization are performed at 0-200° C. for 0.1-100 hrs.

7. The siloxane-based polymer according to claim 1, wherein the organic solvent is an aliphatic hydrocarbon solvent selected from hexane or heptane; an aromatic hydrocarbon solvent selected from anisol, mesitylene or xylene; a ketone-based solvent selected from methyl isobutyl ketone, 1-methyl-2-pyrrolidinone, cyclohexanone or acetone; an ether-based solvent selected from tetrahydrofuran or isopropyl ether; an acetate-based solvent selected from ethyl acetate, butyl acetate or propylene glycol methyl ether acetate; an alcohol-based solvent selected from isopropyl alcohol or butyl alcohol; an amide-based solvent selected from dimethylacetamide or dimethylformamide; a silicon-based solvent; and mixtures thereof.

* * * * *